UNITED STATES PATENT OFFICE.

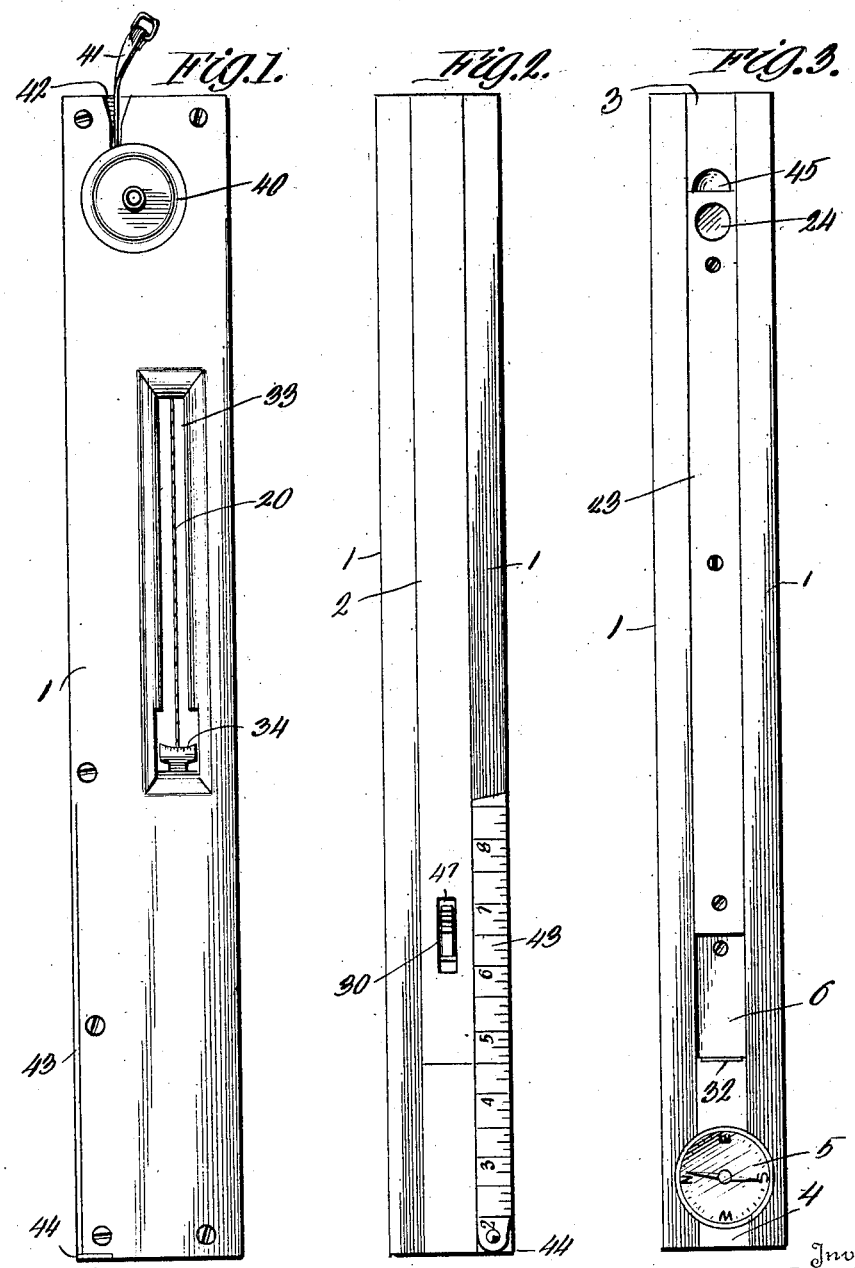

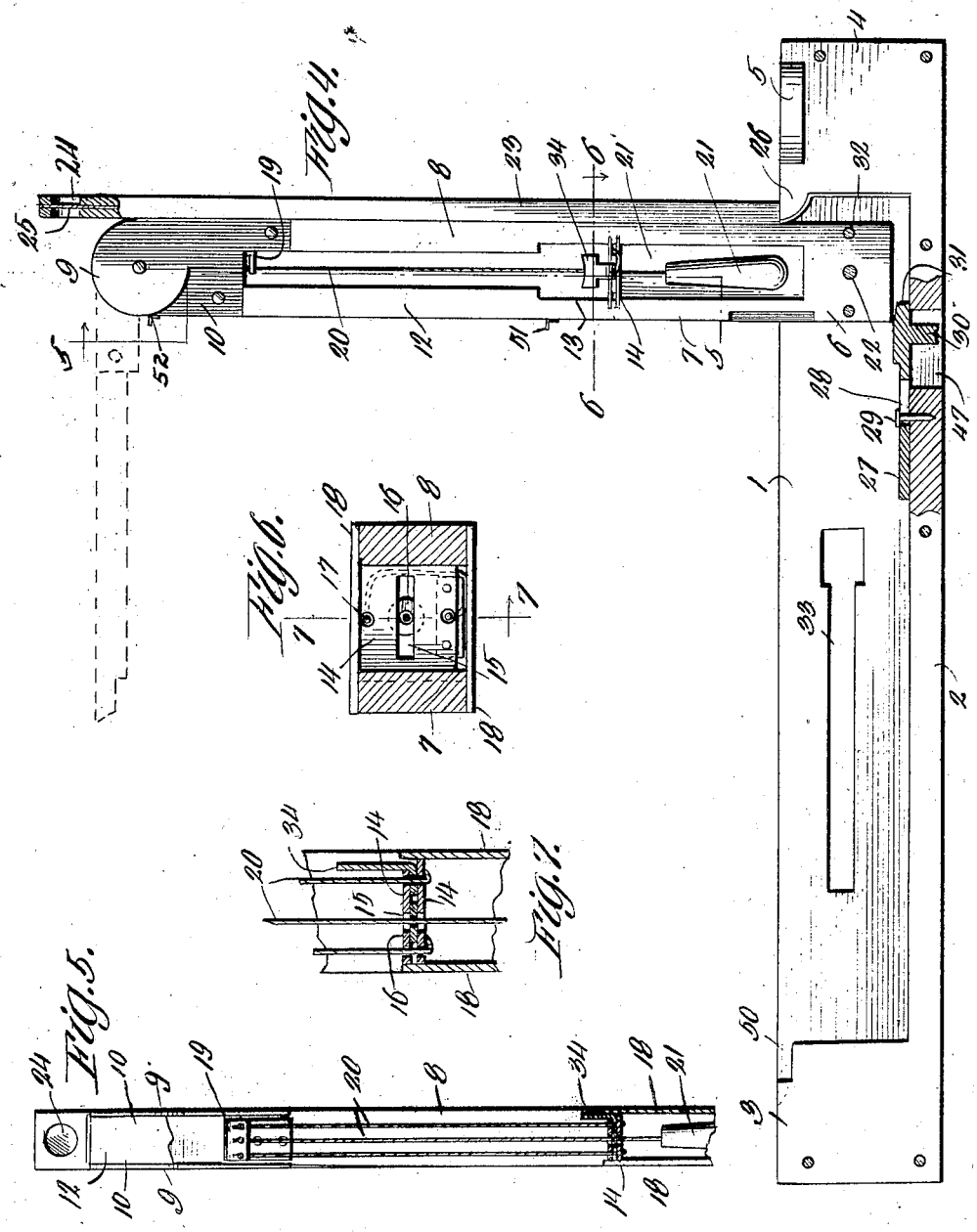

JAMES H. OSBORN, OF MOUNT VERNON, ILLINOIS.

COMBINATION PLUMB-LEVEL.

1,380,243.     Specification of Letters Patent.     Patented May 31, 1921.

Application filed January 23, 1920. Serial No. 353,424.

*To all whom it may concern:*

Be it known that I, JAMES H. OSBORN, a citizen of the United States, residing at Mount Vernon, in the county of Jefferson and State of Illinois, have invented certain new and useful Improvements in Combination Plumb-Levels, of which the following is a specification.

This invention relates to measuring instruments generally and more particularly to combined plumb levels and inclinometers.

The object of the invention is to provide a simple instrument of this character whereby the inclination of a surface or plane may be readily ascertained, said instrument being also capable of use as an ordinary level.

Another object of this invention resides in the combining of a plumb level, compass, line sight, measuring tape, square and inclinometer in an instrument of improved and useful construction.

One of the features of the invention resides in the construction and combination of elements whereby an easily adjustable instrument is provided which can be folded compactly having no projecting portions.

Another feature of the invention resides in the construction of a housing whereby the same will not become entangled with the plumb line when the same is inoperative and the device is in a folded position, and being carried about.

A still further feature of the invention is the provision of simple and efficient means for holding the plumb line support at right angles to the body of the instrument when so desired and the same means will also be used for holding the plumb line instrument at an acute angle to the body portion of the instrument.

The various features of novelty whereby my invention is characterized will hereinafter be pointed out with particularity in the claims; but for a full understanding of my invention and its various objects, advantages and uses, reference may be had to the following detailed description taken in connection with the accompanying drawings, wherein:

Figure 1 is a plan view showing one side of my invention.

Fig. 2 is a plan view showing the bottom thereof.

Fig. 3 is a plan view showing the top thereof.

Fig. 4 is a side elevation showing my instrument in an operative position having one of the side portions of the body removed.

Figs. 5 and 6 are sections taken on the lines 5—5 and 6—6 respectively of Fig. 4 and Fig. 7 is a section taken on the line 7—7 of Fig. 6.

By referring to the accompanying drawings by numerals it will be seen that 1 designates the side portions of the body of the instrument which are held to the bottom portion 2 by means of screws. The bottom portion 2 is provided with the blocks 3 and 4 at each end for a purpose to be hereinafter described. The side portions 1 are parallel and spaced apart so as to form a channel in which normally rests the plumb carrying instrument 6. This plumb carrying instrument 6 is pivoted to the side portions 1 by means of the rivet 22 adjacent the block 4. The plumb carrying instrument 6 consists of the elongated arm 8 and the relatively short arm 7 which arms extend parallel to each other so as to provide a space therebetween. Adjacent the top of the elongated arm 8 there is situated a bracket 19 which is provided with a center aperture and two end apertures as is clearly shown in Fig. 5 of the drawing. The cord 20 is knotted at one end and then passed through one of the end openings in the bracket 19 in a manner to be hereinafter set forth.

Adjacent the top of the relative short arm 7 there are provided the parallel and spaced apart plates 14 which are provided with the registering and transverse slots 15. An arcuate scale is provided so as to be carried by said plate. This arcuate scale 34 consists of an upright portion and is bent to form a right angle so as to extend between the plates 14 as is clearly shown in Fig. 7. The plates 14 are provided with a pair of apertures whereby the cord 20 may be passed through one of the apertures and passed around the arcuate scale 34 as shown in Fig. 6 and then passed upwardly through the other apertures in the plates 14. The cord will then be passed through the remaining aperture in the bracket 19 and finally through its central aperture so as to pass downwardly through the slot 15 in the plate 14. The cord passes through a washer 16 which is slidably situated between the plates 14 as is clearly shown in Figs. 6 and 7. A bob 21 is fixedly attached to the end of the cord 20 and is situated within the plumb bob housing 21' which is formed or inclosed by the arms 7 and 8 and the plates 18. By such a construction it will be readily seen that it will be impossible for the bob 21 to become entangled with the plumb line 20.

At the upper terminals of the arm 8 there is situated a pair of plates 9 which are parallel and spaced apart so as to receive the plate 10 between which is situated the sight rod 12. The upper end of the arm 7 and the lower end of the sight rod 12 are beveled as shown at 13 so as to abut each other. Sights 51 and 52 are provided upon the sight rod 12 so that when same is in the position shown in dotted lines in Fig. 4 they will be in alinement with the opening 24 provided at the upper end of the bar 23 which is fixedly attached to the arm 8. A lens 25 is provided in the opening 24.

In order to measure the inclination of a plane or surface it will be readily understood that the body portion of the instrument will be placed upon the plane and the plumb carrying instrument placed in a position shown in Fig. 4. The sight rod 12 will then be raised to the position shown in dotted lines in Fig. 4 which is at right angles to the rod 8. It should be understood that the plates 10 will hold this rod 12 in the dotted line position because of the frictional engagement with the plates 9. It will then be seen that by using a target of the same height as the sight 52 the operator may place the sights 51 and 52 in alinement with the target by looking through the lens 25 after which he may read the angle upon the graduated arcuate degree scale 34 made by the plumb line 20.

A latch 27 is provided for holding the plumb carrying instrument at the desired angles to the body portion of the instrument and consists of the wedge portion 31 which will engage the body portions of the instrument 6. The latch is also provided with a slot 28 for receiving the pin 29 and in order to operate the latch there is provided a handle or knob 30 which extends through a slot 47 provided in the bottom portion of the instrument as indicated at 2. A shoulder 26 is provided upon the block 4 so as to engage the bottom of the bar 23 when the arm and bar 23 are at right angles to the bottom 2. Other features of the invention are the compass 5 which is situated in the top portion of the block 4. The square 3 which is pivoted in a cut out portion at one edge of the side 1 and may be swung at right angles thereto so as to abut the stop 44. In this same side 1 there is also provided at the other end thereof a drum casing 40 for receiving the spring wound tape 41 which will pass through the slot 42 provided in the side 1 as is clearly shown in Fig. 1 of the drawing.

When it is desired to use this instrument for testing horizontal planes or surfaces, it will be readily understood that the plumb carrying instrument 6 will be extended at right angles to the body 2 and held securely in such a position by the latch 27. The bottom 2 may then be placed upon the surface and if same is horizontal it will be seen that the cord 20 will register with the center line upon the arcuate scale 34. When it is desired to test a vertical wall or plane, the plumb carrying instrument will be folded in between the sides 1 so as to extend parallel with the bottom 2. The bottom 2 may then be placed against the wall or plane and the desired reading will be had through the elongated slot 33, as is shown in Figs. 1 and 4 of the drawing. The shoulder 26 is provided on the block 4 to hold the arm 23 at right angles to the bottom 2 and is braced and protected by the metal strip 32 as is clearly shown in Fig. 4.

Having thus described my invention what I claim as new is:—

1. A device of the class described comprising a casing having an elongated slot therein, a plumb carrying instrument pivoted to said casing so as to be received in said slot, said instrument comprising a pair of parallel spaced apart arms, a bracket situated upon the top of one of said arms, a plumb line attached to said bracket, a bob attached to said plumb line, a pair of spaced apart parallel plates extending between said arms and provided with registering slots adapted to receive said plumb line.

2. A device of the class described comprising a casing having an elongated slot therein, a plumb carrying instrument pivoted to said casing so as to be received in said slot, said instrument comprising a pair of parallel spaced apart arms, a bracket situated upon the top of one of said arms, a plumb line attached to said bracket, a bob attached to said plumb line, a pair of spaced apart parallel plates extending between said arms and provided with registering slots adapted to receive said plumb line, and means provided upon said arms so as to completely inclose said bob.

3. A device of the class described comprising a casing having an elongated slot therein, a plumb carrying instrument pivoted to said casing so as to be received in said slot, said instrument comprising a pair of parallel spaced apart arms, a bracket situated upon the top of one of said arms, a plumb line attached to said bracket, a bob attached to said plumb line, a pair of spaced apart parallel plates extending between said arms and provided with registering slots adapted to receive said plumb rod, and a washer slidably mounted between said plates and provided with an aperture for receiving said plumb line.

4. A device of the class described comprising a casing having an elongated slot therein, a plumb carrying instrument pivoted to said casing so as be received in said slot, said instrument comprising a pair of parallel spaced apart arms, a bracket situated upon the top of one of said arms, a plumb line attached to said bracket, a bob attached to said plumb line, a pair of spaced apart parallel plates extending between said arms and provided with registering slots adapted to receive said plumb line, a washer slidably mounted between said plates and provided with an aperture for receiving said plumb rod, an arcuate scale situated between said plates and curved so as to extend at right angles thereto and graduated so as to indicate the angular position of the plumb carrying instrument with respect to the earth.

In testimony whereof I affix my signature in presence of two witnesses.

JAMES H. OSBORN.

Witnesses:
 URIE K. DANNER,
 NORMAN A. PIERCY.